(12) United States Patent
Fukuzawa et al.

(10) Patent No.: US 9,335,705 B1
(45) Date of Patent: May 10, 2016

(54) ROTOR BEARING MEMBER, PHOTOCONDUCTOR UNIT INCLUDING THE SAME, AND IMAGE FORMING APPARATUS

(71) Applicant: FUJI XEROX CO., LTD., Tokyo (JP)

(72) Inventors: Tsuneo Fukuzawa, Kanagawa (JP); Hirohisa Hoshino, Kanagawa (JP); Takeo Fukai, Kanagawa (JP); Koji Fukumuro, Kanagawa (JP); Kenji Suzuki, Kanagawa (JP); Hirokazu Ichihara, Kanagawa (JP); Akihito Nishimura, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/721,660

(22) Filed: May 26, 2015

(30) Foreign Application Priority Data

Nov. 26, 2014 (JP) .................................. 2014-238337

(51) Int. Cl.
*G03G 15/02* (2006.01)
*G03G 15/00* (2006.01)
*F16C 17/26* (2006.01)

(52) U.S. Cl.
CPC ................ *G03G 15/75* (2013.01); *F16C 17/26* (2013.01)

(58) Field of Classification Search
CPC ...................... G03G 15/0225; G03G 15/0258
USPC .................................................. 399/100, 176
See application file for complete search history.

(56) References Cited

U.S. PATENT DOCUMENTS

| | | | | |
|---|---|---|---|---|
| 7,460,810 B2 * | 12/2008 | Sampe et al. | ...... | G03G 15/0225 399/100 |
| 8,126,354 B2 | 2/2012 | Tanaka | | |
| 8,849,150 B2 | 9/2014 | Yamaguchi et al. | | |
| 2007/0286635 A1 * | 12/2007 | Matsui et al. | ...... | G03G 21/0058 399/100 |
| 2010/0104320 A1 * | 4/2010 | Moon et al. | ............ | G03G 15/02 399/176 |

FOREIGN PATENT DOCUMENTS

JP       2013-200448 A     10/2013

* cited by examiner

*Primary Examiner* — William J Royer
(74) *Attorney, Agent, or Firm* — Sughrue Mion, PLLC

(57) ABSTRACT

A rotor bearing member is attached to a support body. The support body includes a guide section that supports a first member and a second member such that the first member and the second member are movable toward a rotor. The first member includes a rotary shaft and rotates about the rotary shaft thereof while being in contact with the rotor. The second member includes a rotary shaft extending along the rotary shaft of the first member and cleans a surface of the first member while rotating in contact with the first member. The rotor bearing member includes a first bearing member and a second bearing member that rotatably support the rotary shaft of the second member and the rotary shaft of the first member, respectively, while the first bearing member and the second bearing member abut each other.

8 Claims, 13 Drawing Sheets

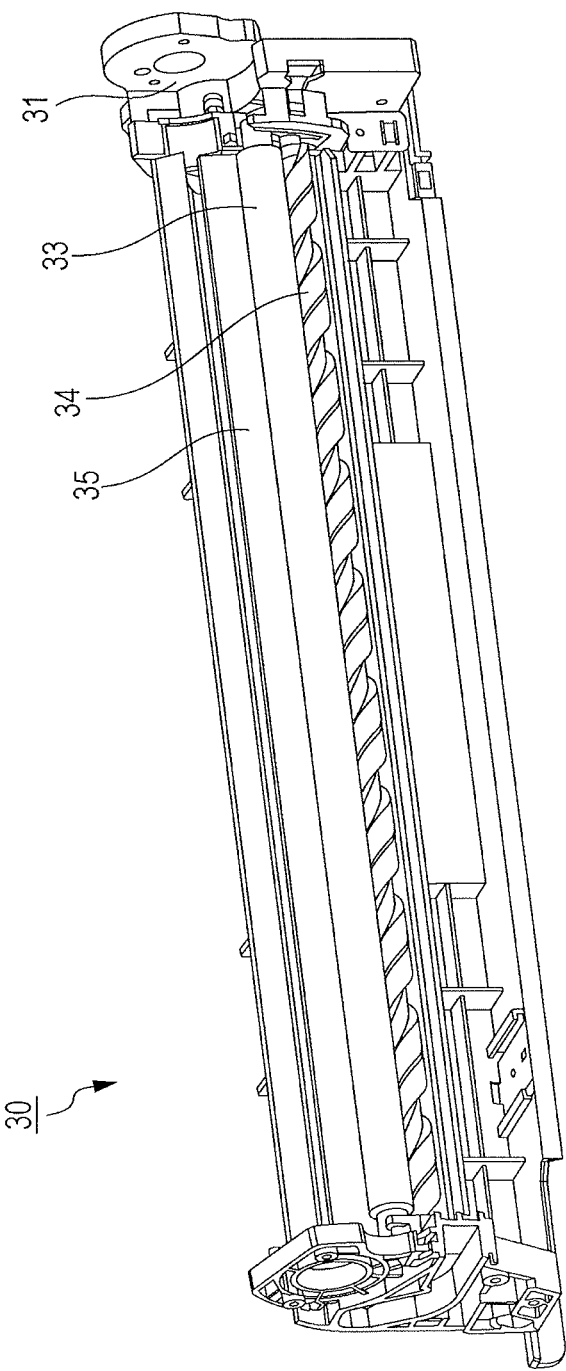

ROTOR BEARING MEMBER, PHOTOCONDUCTOR UNIT INCLUDING THE SAME, AND IMAGE FORMING APPARATUS

CROSS-REFERENCE TO RELATED APPLICATIONS

This application is based on and claims priority under 35 USC 119 from Japanese Patent Application No. 2014-238337 filed Nov. 26, 2014.

BACKGROUND

Technical Field

The present invention relates to a rotor bearing member, a photoconductor unit including the same, and an image forming apparatus.

SUMMARY

According to an aspect of the invention, there is provided a rotor bearing member that is attached to a support body, wherein the support body includes a guide section that supports a first member and a second member such that the first member and the second member are movable toward a rotor, the first member including a rotary shaft and rotating about the rotary shaft thereof while being in contact with the rotor, the second member including a rotary shaft which extends along the rotary shaft of the first member and cleaning a surface of the first member while rotating in contact with the first member. The rotor bearing member includes: a first bearing member that rotatably supports the rotary shaft of the second member; and a second bearing member that rotatably supports the rotary shaft of the first member; wherein the first bearing member and the second bearing member support the rotary shaft of the second member and the rotary shaft of the first member, respectively, while the first bearing member and the second bearing member abut each other.

BRIEF DESCRIPTION OF THE DRAWINGS

Exemplary embodiments of the present invention will be described in detail based on the following figures, wherein:

FIG. 3 is a perspective view illustrating an inner surface side of the photoconductor unit with a photoconductor drum removed;

DETAILED DESCRIPTION

Hereinafter, the present invention will be described in detail on the basis of exemplary embodiments, with reference to the accompanying drawings. However, the present invention is not limited to the exemplary embodiments described below.

Further, in the description with reference to the attached drawings, the drawings are schematic and not to scale. Illustration of components other than those needed for the description will be appropriately omitted for ease of understanding.

First Exemplary Embodiment (1) Configuration of Image Forming Apparatus

Figure 1:
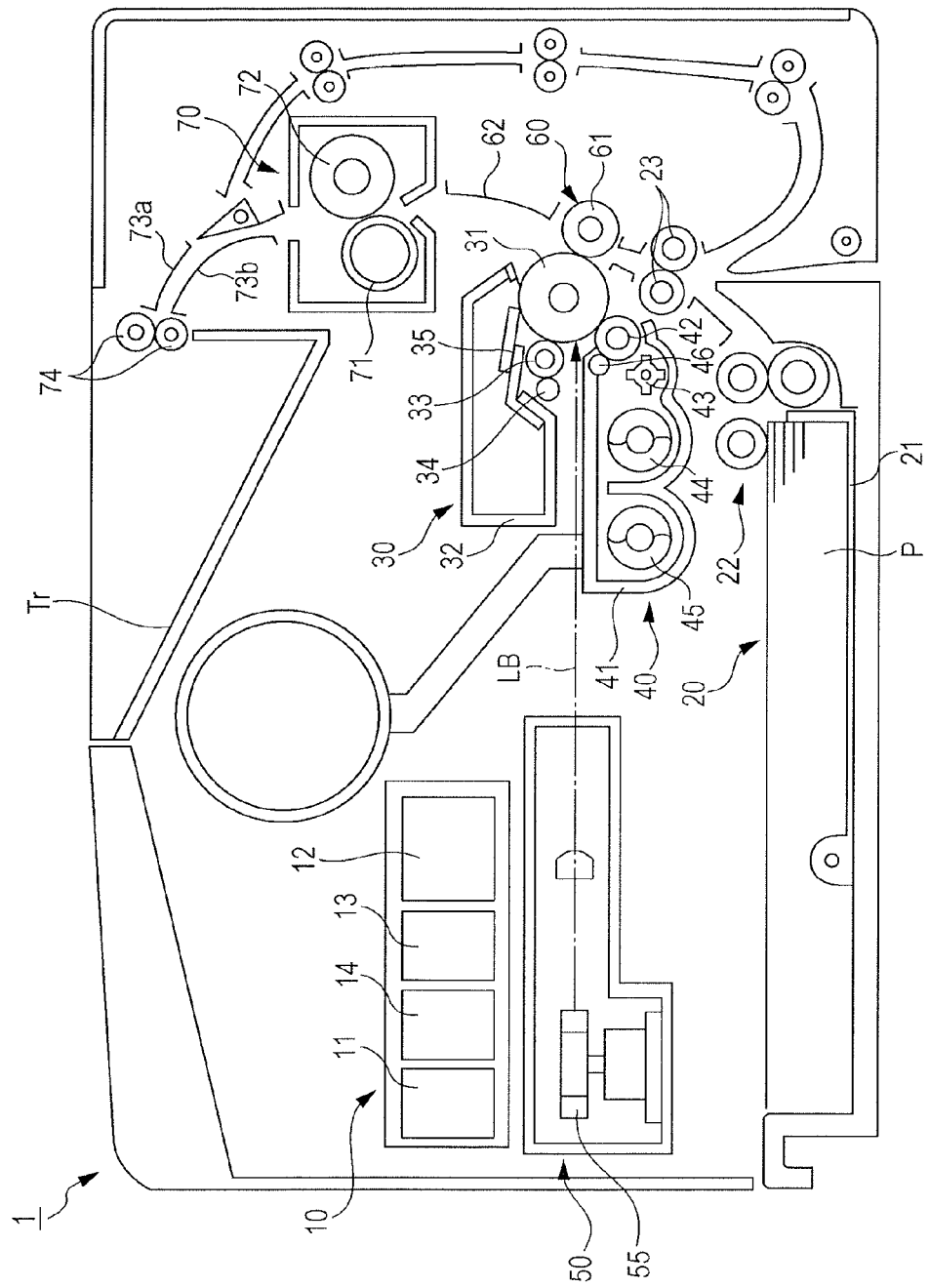
FIG. 1 is a schematic cross-sectional view illustrating the internal structure of an image forming apparatus.

FIG. 1 is a schematic cross-sectional view illustrating the internal configuration of an image forming apparatus 1 according to the present exemplary embodiment.

In the following, the overall configuration and operation of the image forming apparatus 1 will be described with reference to the drawings.

The image forming apparatus 1 includes a control device 10, a sheet feeder 20, a photoconductor unit 30, a developing device 40, an exposure device 50, a transfer device 60, and a fixing device 70. A discharge tray Tr is formed on the upper surface (in a Z direction) of the image forming apparatus 1. A sheet P with an image printed thereon is discharged and stored in the discharge tray Tr.

The control device 10 includes an image forming apparatus controller 11 that controls operations of the image forming apparatus 1, a controller unit 12 that prepares image data corresponding to a print processing request, an exposure controller 13 that controls the lighting-up of a light source of the exposure device 50, and a power supply device 14. The power supply device 14 applies voltage to a charging roller 33, a cleaning roller 34, a developing roller 42, a transfer roller 61, and the like, and also supplies power to the exposure device 50.

The sheet feeder 20 is disposed at the bottom of the image forming apparatus 1. The sheet feeder 20 includes a sheet stacking plate 21. A large number of sheets P serving as recording media may be stacked on the upper surface of the sheet stacking plate 21. The sheets P stacked on the sheet stacking plate 21 and positioned in a width direction by a regulating plate (not illustrated) are drawn forward (in an X direction) one by one from the top by a sheet drawing unit 22, and then are transported to a nip portion of a registration roller pair 23.

The photoconductor unit 30 is disposed above the sheet feeder 20, and includes a rotating photoconductor drum 31 in a unit housing 32. The charging roller 33, the developing device 40, the transfer roller 61, and a cleaning blade 35 are arranged in a rotational direction of the photoconductor drum 31. The cleaning roller 34 that cleans the surface of the charging roller 33 is disposed so as to face and be in contact with the charging roller 33.

The developing device 40 includes a developing housing 41 that stores developer therein. The developing roller 42 and a paddle wheel 43 that agitates and transports the developer toward the developing roller 42 are disposed in the developing housing 41. The developing roller 42 is disposed so as to face the photoconductor drum 31. The paddle wheel 43 is disposed obliquely below the rear surface of the developing roller 42. Further, a pair of augers 44 and 45 for agitation and transportation is disposed at the rear of the paddle wheel 43. A layer regulating roller 46 for regulating the layer thickness of the developer is disposed in close proximity to the developing roller 42.

The exposure device 50 includes a laser beam emitting unit (not illustrated) serving as a light source, and a rotating polygonal mirror 55 that polarizes and reflects a laser beam LB from the laser beam emitting unit. The exposure device 50 scans the surface of the photoconductor drum 31 with the laser beam LB modulated in accordance with data of an image to be formed.

The surface of the rotating photoconductor drum 31 is charged by the charging roller 33, and an electrostatic latent image is formed thereon by the laser beam LB emitted from the exposure device 50. The electrostatic latent image formed on the photoconductor drum 31 is developed into a toner image by the developing roller 42.

The transfer device 60 includes the transfer roller 61 that forms a nip with the photoconductor drum 31, and a sheet transport guide 62. A transfer voltage is applied to the transfer roller 61 from the power supply device 14 controlled by the image forming apparatus controller 11. Thus, the toner image on the photoconductor drum 31 is transferred onto a sheet P passing between the photoconductor drum 31 and the transfer roller 61.

Residual toner on the surface of the photoconductor drum 31 is removed by the cleaning blade 35, and is temporarily collected into the unit housing 32 that supports the photoconductor drum 31. After that, the surface of the photoconductor drum 31 is charged again by the charging roller 33. Residues not removed by the cleaning blade 35 and adhering to the charging roller 33 are captured by the surface of the cleaning roller 34 rotating in contact with the charging roller 33, and then accumulated.

The fixing device 70 includes a pair of fixing rollers 71 and 72, and a fixing area is formed by a press contact area between the fixing rollers 71 and 72.

After the toner image is transferred to the sheet P in the transfer device 60, the sheet P is transported, with the toner image not fixed thereon, to the fixing device 70 via the sheet transport guide 62. When the sheet P is transported to the fixing device 70, the toner image is fixed with pressure and heat by the pair of fixing rollers 71 and 72. The sheet P on which a fixed toner image is formed is guided by transport guides 73a and 73b, and is discharged by a discharge roller pair 74 onto the discharge tray Tr on the upper surface of the image forming apparatus 1.

(2) Configuration and Function of Photoconductor Unit

Figure 2A:
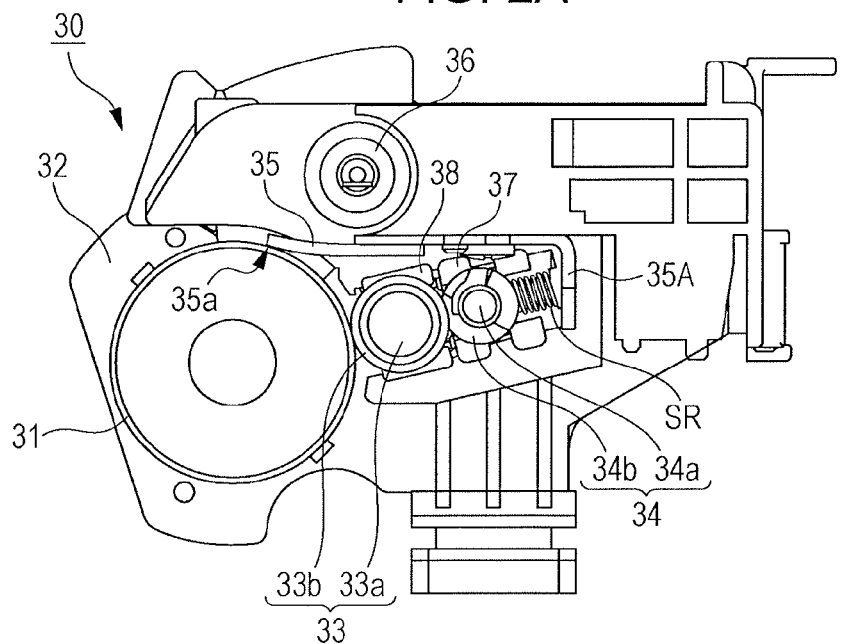
FIG. 2A is a cross-sectional view illustrating a photoconductor unit.
Figure 2B:
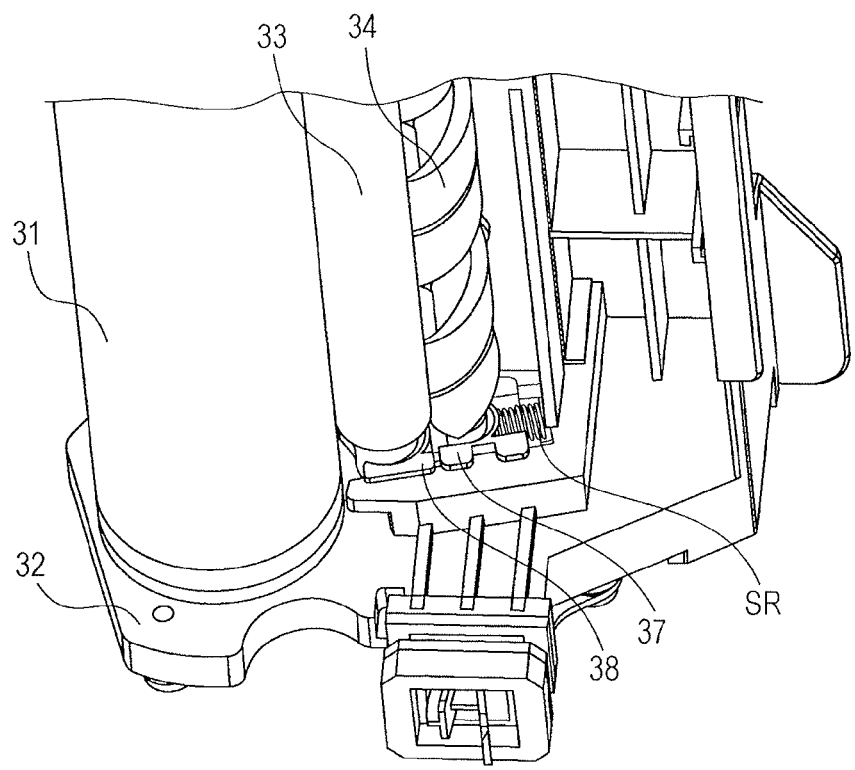
FIG. 2B is a perspective view illustrating one end of an inner surface of the photoconductor unit.

FIG. 2A is a cross-sectional view illustrating the photoconductor unit 30. FIG. 2B is a perspective view illustrating one end of an inner surface of the photoconductor unit 30. FIG. 3 is a perspective view illustrating an inner surface side of the photoconductor unit 30 with the photoconductor drum 31 removed.

In the following, the configuration and function of the photoconductor unit 30 will be described with reference to the drawings.

The photoconductor unit 30 chiefly includes the photoconductor drum 31 as an image carrier, the unit housing 32 as a support body, the charging roller 33 as a charging member, the cleaning roller 34 as a cleaning member, the cleaning blade 35, a toner collection auger 36, a first bearing member 37, a second bearing member 38, and a spring SR.

Note that the photoconductor unit 30 is detachably attached to the image forming apparatus 1.

The unit housing 32 rotatably supports the photoconductor drum 31, and fixedly supports the cleaning blade 35 that cleans the surface of the photoconductor drum 31. Further, the unit housing 32 temporarily stores toner, paper dust, and the like removed from the surface of the photoconductor drum 31 by the cleaning blade 35.

The cleaning blade 35 is made of a material that is excellent in mechanical properties such as abrasion resistance, chipping resistance, and creep resistance (for example, urethane rubber such as thermosetting polyurethane rubber). The cleaning blade 35 is fixed by bonding to a holder 35A having an L-shaped cross section, and is fixed to the unit housing 32 by a screw. A front end 35a of the cleaning blade 35 is in contact with the surface of the photoconductor drum 31 with a predetermined contact pressure, and removes toner, paper dust, and the like from the surface of the photoconductor drum 31.

The toner collection auger 36 includes a screw, and transports waste toner and the like removed from the surface of the photoconductor drum 31 and stored in the unit housing 32 to a waste toner box (not illustrated) while agitating the waste toner and the like.

The unit housing 32 rotatably supports the charging roller 33, and also rotatably supports the cleaning roller 34 that is disposed so as to face and be in contact with the charging roller 33. The charging roller 33 and the cleaning roller 34 are rotatably and movably supported in the unit housing 32 via the second bearing member 38 and the first bearing member 37, respectively.

The charging roller 33 is pressed against the photoconductor drum 31 with a predetermined load via the spring SR, and is elastically deformed along the peripheral surface of the charging roller 33 so as to form a charging nip portion.

The charging roller 33 includes a conductive shaft 33a and a charging layer 33b including a conductive elastic layer and a surface layer that are sequentially formed on the conductive shaft 33a.

The conductive elastic layer of the charging layer 33b is formed by coating the peripheral surface of the conductive shaft 33a with an elastic material (such as rubber) having elasticity to which a conductive material (such as carbon black and ion conductive material) that adjusts the resistance of the conductive elastic layer is appropriately added, for example.

The surface layer of the charging layer 33b is provided in order to prevent contamination by toner components, paper dust, and the like. The material of the surface layer is not particularly limited, and any of resin, rubber, and the like may be used. However, it is preferable that the surface layer be made of fluorine or silicone resin, in particular, fluorine-modified acrylate polymer.

The cleaning roller 34 is formed by spirally winding a sponge layer 34b made of porous foam around a shaft 34a made of free-cutting steel, stainless steel, or the like. The sponge layer 34b effectively cleans external additives of toner, paper dust, and the like by following the rotation of the charging roller 33 and rubbing the charging roller 33.

When the external additives of toner and paper dust collected inside the cells of the sponge layer 34b aggregate to an appropriate size, the aggregated external additives of toner and paper dust are returned to the photoconductor drum 31 from the cleaning roller 34 via the charging roller 33, and removed and collected by the cleaning blade 35 that cleans the photoconductor drum 31.

(3) Bearing Members for Charging Roller and Cleaning Roller

Figure 4:
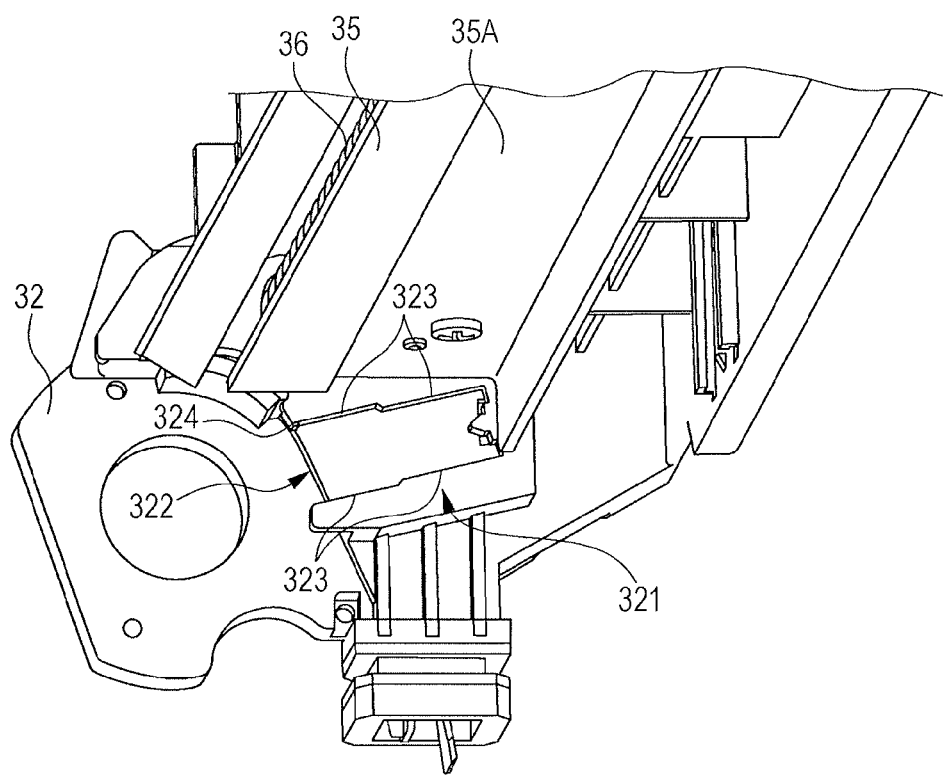
FIG. 4 is a perspective view illustrating one end of an attachment section for a first bearing member and a second bearing member in a unit housing.
Figure 5A:
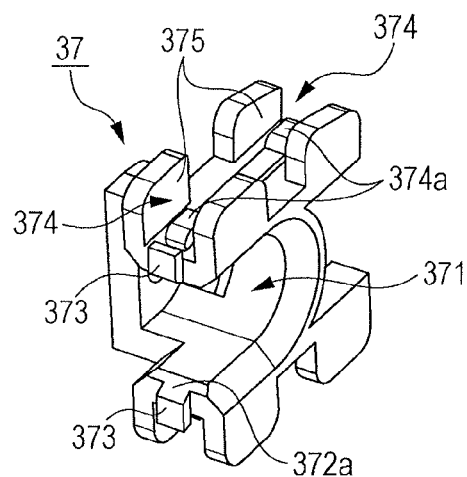
FIGS. 5A, 5B, and 5C are a perspective view, a front view, and a plan view, respectively, illustrating the first bearing member.
Figure 5B:
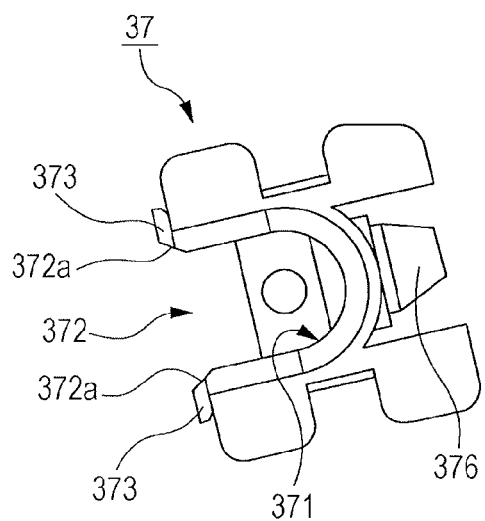
Figure 5C:
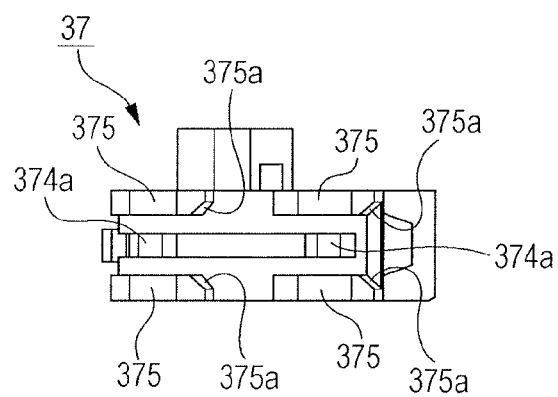
Figure 6A:
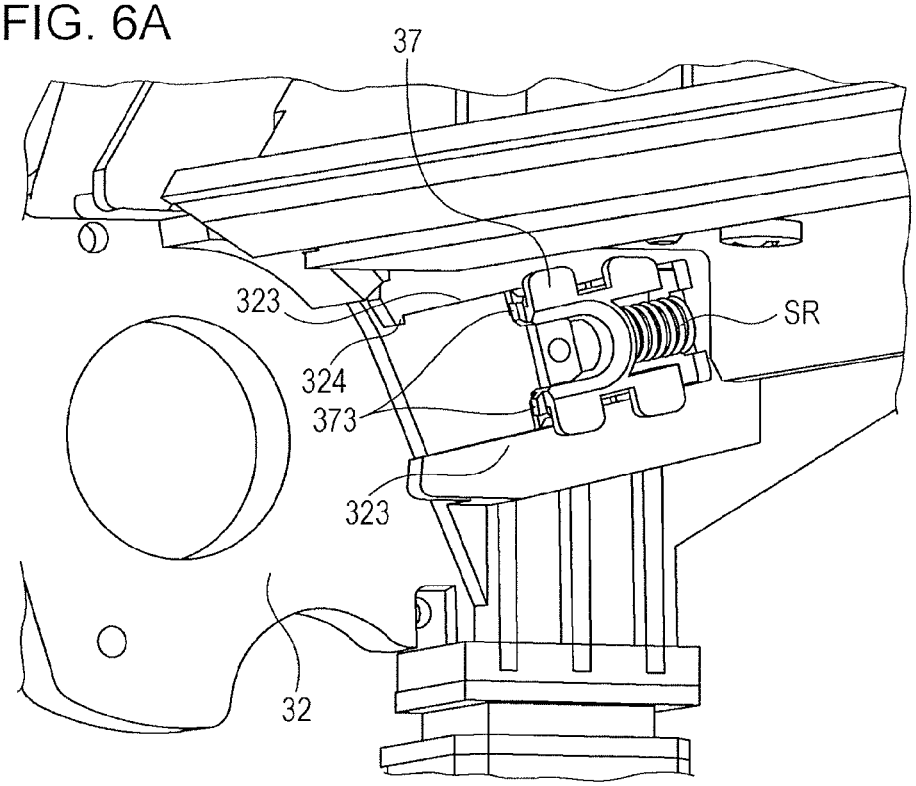
FIG. 6A is a perspective view illustrating the first bearing member attached to the unit housing.
Figure 6B:
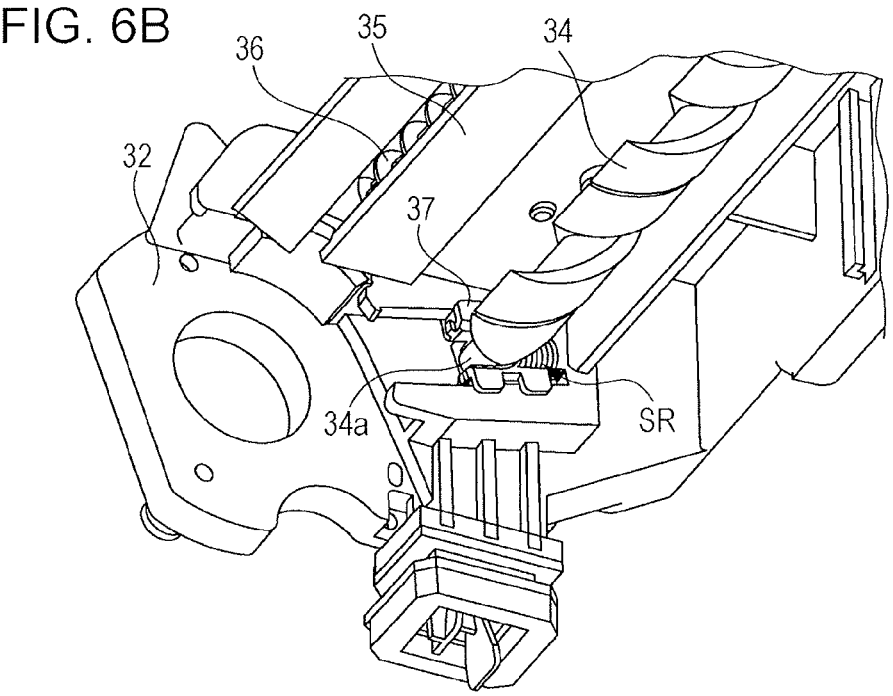
FIG. 6B is a perspective view illustrating a cleaning roller supported by the first bearing member.
Figure 7A:
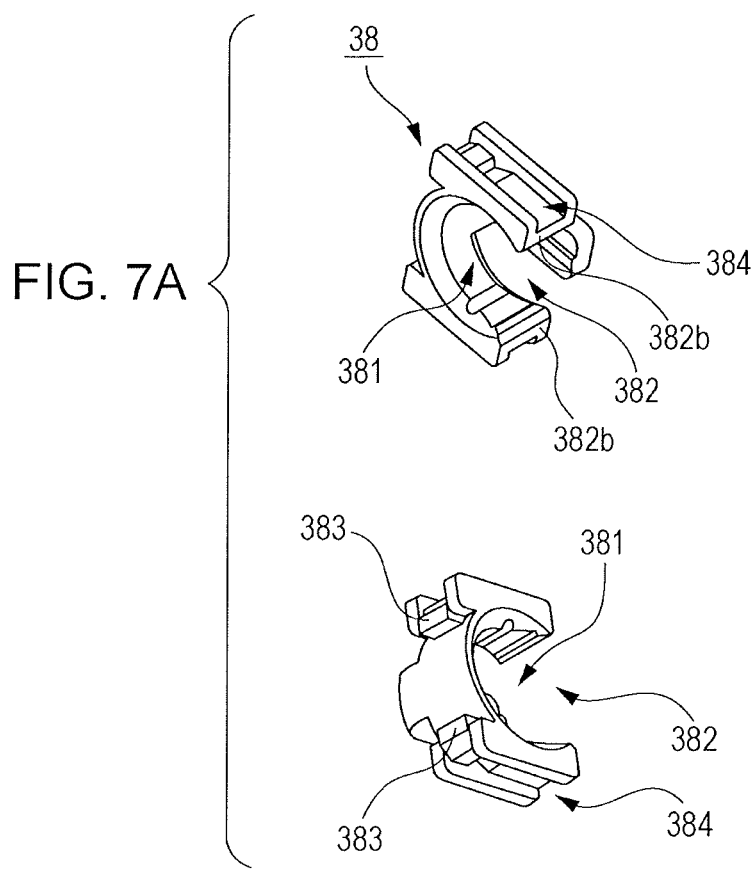
FIGS. 7A, 7B, and 7C are perspective views, a front view, and a plan view, respectively, illustrating the second bearing member.
Figure 7B:
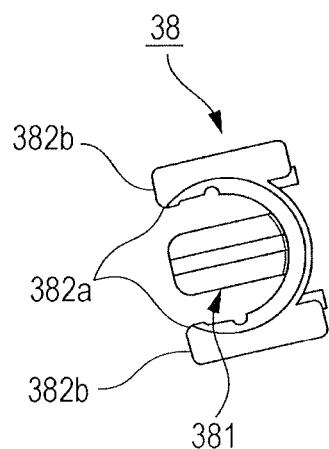
Figure 7C:
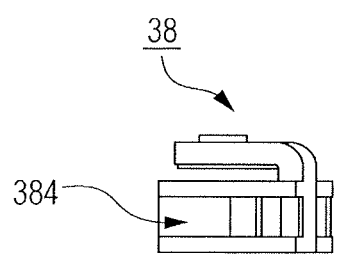
Figure 8A:
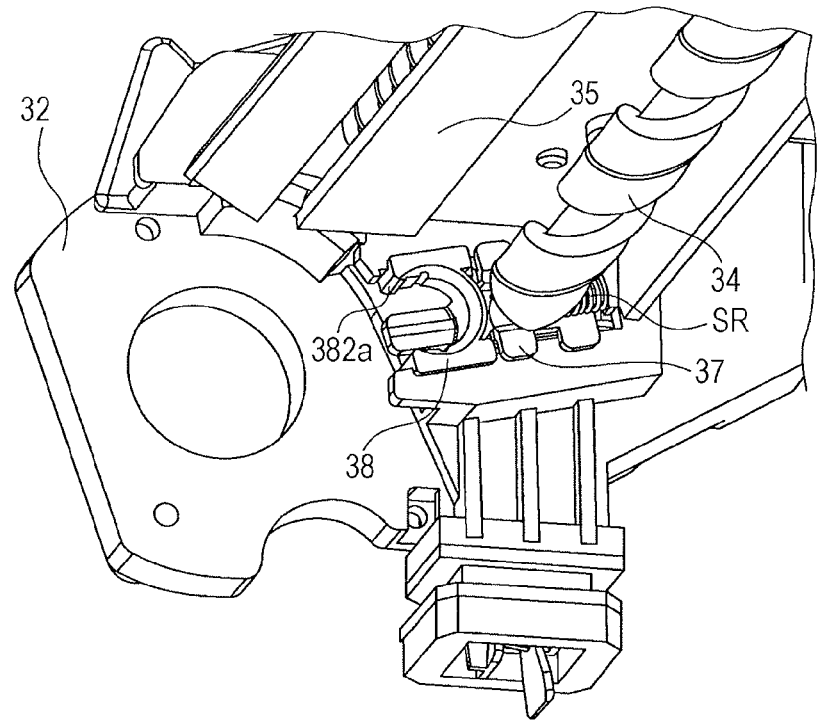
FIG. 8A is a perspective view illustrating the first bearing member and the second bearing member attached to the unit housing.
Figure 8B:
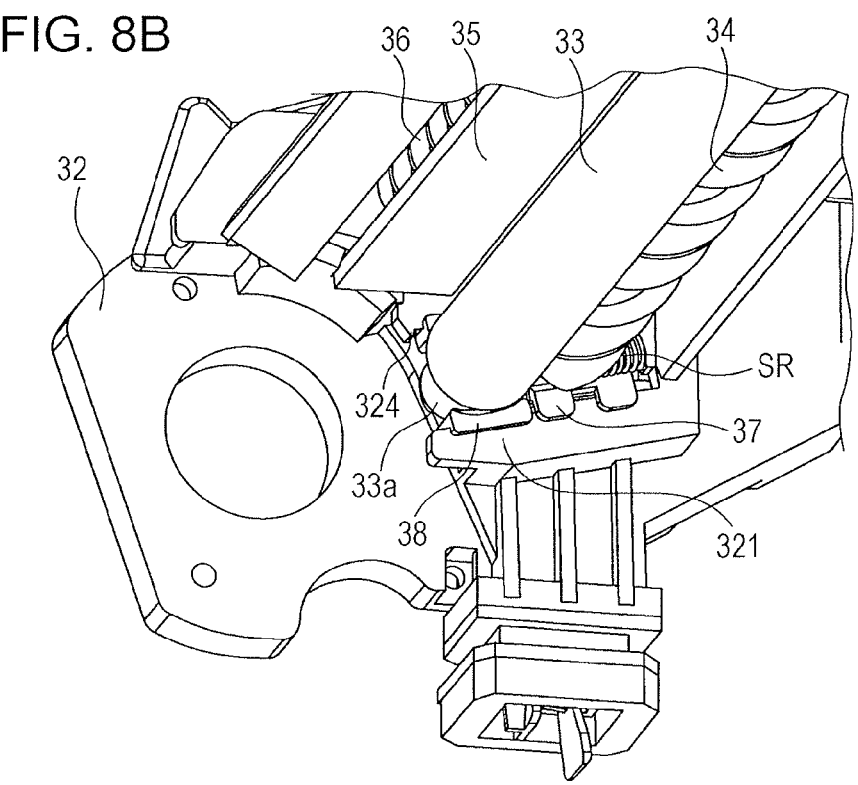
FIG. 8B is a perspective view illustrating one end of the unit housing with a charging roller and the cleaning roller supported therein.
Figure 9A:
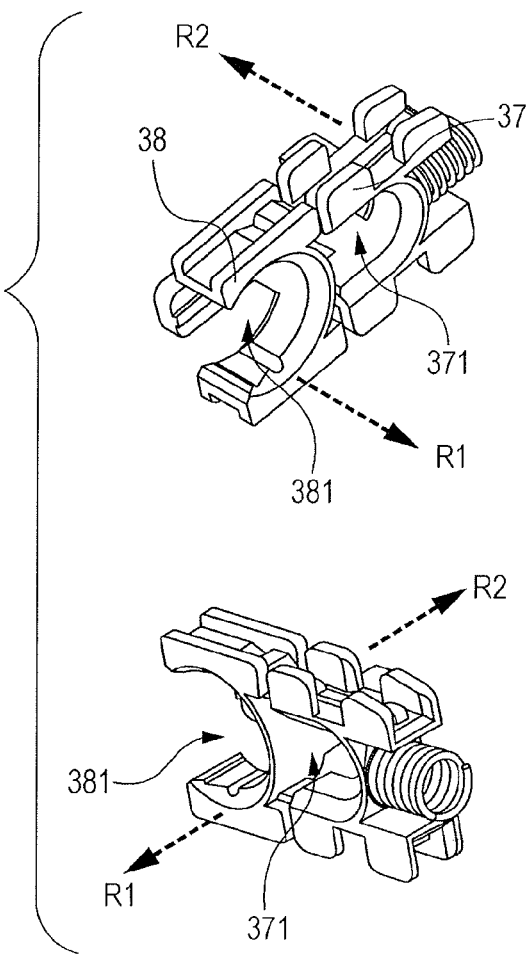
FIGS. 9A, 9B, and 9C are a perspective view, a front view, and perspective views, respectively, illustrating the abutting state between the first bearing member and the second bearing member.
Figure 9B:
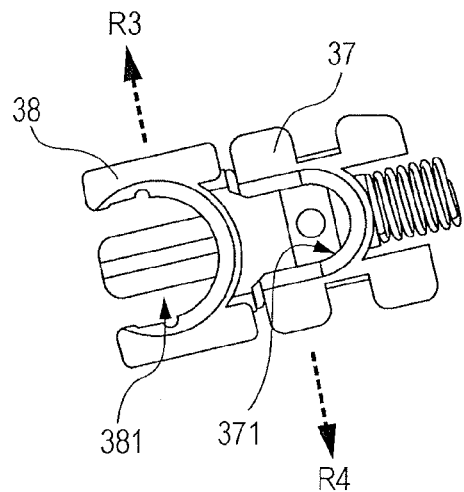
Figure 9C:
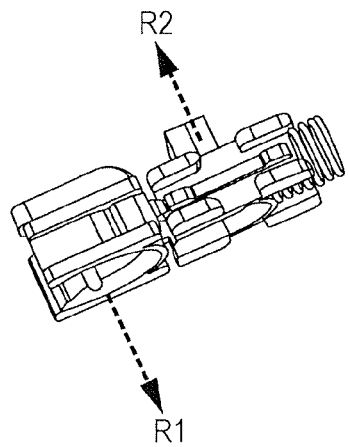

FIG. 4 is a perspective view illustrating one end of an attachment section for the first bearing member 37 and the second bearing member 38 in the unit housing 32. FIGS. 5A, 5B, and 5C are a perspective view, a front view, and a plan view, respectively, illustrating the first bearing member 37. FIG. 6A is a perspective view illustrating the first bearing member 37 attached to the unit housing 32. FIG. 6B is a perspective view illustrating the cleaning roller 34 supported by the first bearing member 37. FIGS. 7A, 7B, and 7C are perspective views, a front view, and a plan view, respectively, illustrating the second bearing member 38. FIG. 8A is a perspective view illustrating the first bearing member 37 and the second bearing member 38 attached to the unit housing 32. FIG. 8B is a perspective view illustrating one end of the unit housing 32 with the charging roller 33 and the cleaning roller 34 supported therein. FIGS. 9A, 9B, and 9C are perspective views, a front view, and a plan view, respectively, illustrating the abutting state between the first bearing member 37 and the second bearing member 38.

(3.1) Unit Housing

As illustrated in FIG. 4, the unit housing 32 includes a guide section 321 on the inner surface of each side thereof. The guide section 321 supports the first bearing member 37 and the second bearing member 38 such that the first bearing member 37 and the second bearing member 38 are movable toward the photoconductor drum 31. The guide section 321 has an open portion 322 facing the photoconductor drum 31. The first bearing member 37 and the second bearing member 38 are attached to the guide section 321 by being inserted from the open portion 322.

The guide section 321 includes ribs 323 on which grooves 374 of the first bearing member 37 and grooves 384 of the second bearing member 38 (describe below) are movably fitted.

A protrusion 324 protruding inward in a direction perpendicular to a direction in which the first bearing member 37 and the second bearing member 38 are attached is formed at each of corners of the open portion 322 of the guide section 321. The protrusion 324 serves as a stopper that prevents the first bearing member 37 and the second bearing member 38 movably inserted in the guide section 321 from coming off.

(3.2) First Bearing Member

As illustrated in FIGS. 5A through 5C, the first bearing member 37 includes a bearing section 371 that rotatably supports the shaft 34a of the cleaning roller 34. The bearing section 371 has a recessed shape having an open portion 372 at one end thereof and having a round bottom at the other end thereof. A boss 376 is formed on the outer side of the round bottom. The boss 376 holds one end of the spring SR serving as a biasing member that biases the cleaning roller 34 against the charging roller 33 via the first bearing member 37.

Inclined surfaces 372a are formed one at each of corners of the open portion 372 of the bearing section 371 such that the shaft 34a of the cleaning roller 34 is easily mounted.

Protrusions 373 are formed one on each of surfaces of the open portion 372 that abut the second bearing member 38. When the protrusions 373 abut the second bearing member 38 (described below), even if the cleaning roller 34 rotatably supported by the first bearing member 37 and the charging roller 33 rotatably supported by the second bearing member 38 are tilted or twisted with respect to each other in the axial direction, the abutting contact surfaces are small due to the protrusions 373. This reduces the misalignment between the cleaning roller 34 and the charging roller 33 in the axial direction.

The grooves 374 are provided one on each of outer sides of the bearing section 371 of the first bearing member 37. The grooves 374 fit on the ribs 323 of the guide section 321 of the unit housing 32. Projections 374a are formed on the bottom of each groove 374.

The projections 374a reduce the contact area with the rib 323 and reduce the sliding resistance when inserted and movably fitted on the guide section 321 of the unit housing 32.

Side walls 375 extend upright from the bottom of each groove 374. Inclined surfaces 375a are formed one at each of corners of the side walls 375 on a side to be inserted into the guide section 321 of the unit housing 32. Thus, the first bearing member 37 is easily mounted in the guide section 321 of the unit housing 32.

As illustrated in FIG. 6A, the first bearing member 37 having the configuration described above is inserted in the guide section 321 of the unit housing 32, and is movably supported such that the protrusions 373 are positioned on the side that abuts the second bearing member 38 (described below).

Then, the shaft 34a of the cleaning roller 34 is mounted from the open portion 372 of the bearing section 371, so that the cleaning roller 34 is rotatably and movably supported in the unit housing 32 (see FIG. 6B).

(3.3) Second Bearing Member

As illustrated in FIGS. 7A through 7C, the second bearing member 38 includes a bearing section 381 that rotatably supports the shaft 33a of the charging roller 33. The bearing section 381 has a recessed shape having an open portion 382 at one end thereof and having a round bottom at the other end thereof.

The grooves 384 are formed one on each of outer sides of the bearing section 381 of the second bearing member 38. The grooves 384 are inserted and movably fitted on the guide section 321 of the unit housing 32.

Abutting portions 383 are formed one on each of outer sides of the round bottom of the bearing section 381. When inserted in the guide section 321 of the unit housing 32, the abutting portions 383 abut the protrusions 373 of the first bearing member 37 so as to maintain the contact between the charging roller 33 and the cleaning roller 34 with a predetermined amount of nip, and maintain alignment between the cleaning roller 34 and the charging roller 33 in the axial direction.

Inclined surfaces 382a are formed one at each of corners of the open portion 382 such that the shaft 33a of the charging roller 33 is easily mounted.

An outer side surface 382b of each inclined surface 382a abuts the protrusion 324 protruding toward the inner side of the open portion 322 of the guide section 321 and serves as a stopper for the first bearing member 37 and the second bearing member 38, when inserted in the guide section 321 of the unit housing 32.

As illustrated in FIG. 8A, the second bearing member 38 having the configuration described above is inserted in the guide section 321 of the unit housing 32, and is movably supported while abutting the protrusions 373 of the already inserted first bearing member 37.

Then, the shaft 33a of the charging roller 33 is mounted from the open portion 382 of the bearing section 381, so that the charging roller 33 is rotatably and movably supported in the unit housing 32 (see FIG. 8B).

According to a rotor support structure for the charging roller 33 and the cleaning roller 34 of this exemplary embodiment, the first bearing member 37 is inserted in the guide section 321 of the unit housing 32, and then the cleaning roller 34 is mounted. After that, the second bearing member 38 is inserted, and then the charging roller 33 is mounted on the second bearing member 38.

Accordingly, the first bearing member 37 and the second bearing member 38 are sequentially mounted in the unit housing 32. That is, the first bearing member 37 and the second bearing member 38 as well as the charging roller 33 and the cleaning roller 34 are sequentially inserted in the same direction from the open section 322.

(3.4) Abutting State Between First Bearing Member and Second Bearing Member

FIGS. 9A through 9C illustrate the abutting state between the first bearing member 37 and the second bearing member 38. The contact area between the first bearing member 37 and the second bearing member 38 is small when the protrusions 373 of the first bearing member 37 that is inserted in the guide section 321 of the unit housing 32 earlier and the abutting portions 383 formed on the outer side of the round bottom of the bearing section 381 of the second bearing member 38 that is inserted later are in contact and abutment with each other.

Accordingly, even in the case where the cleaning roller 34 rotatably supported by the first bearing member 37 and the charging roller 33 rotatably supported by the second bearing member 38 are tilted or twisted with respect to each other in the axial direction (see arrows R1 through R4 in FIGS. 9A through 9C), the misalignment between the cleaning roller 34 and the charging roller 33 in the axial direction is reduced.

Second Exemplary Embodiment

Figure 10A:
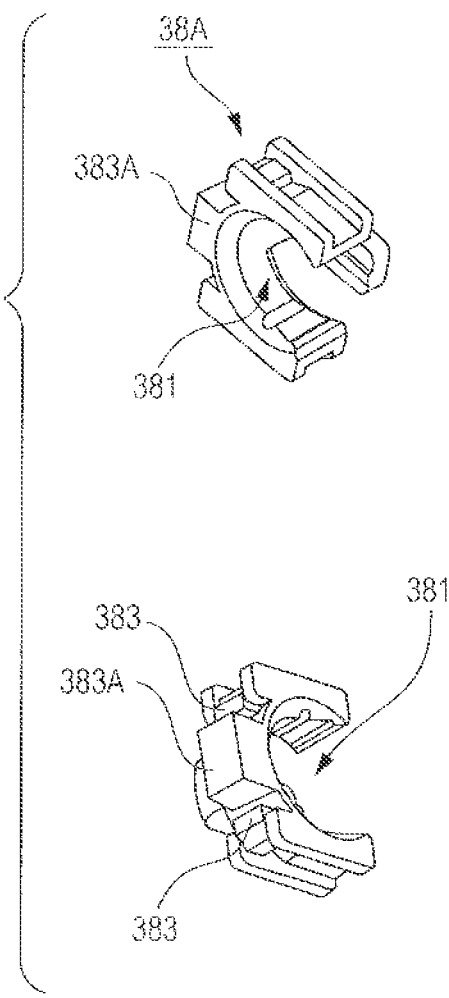
FIGS. 10A and 10B are perspective views and a front view, respectively, illustrating a second bearing member.
Figure 10B:
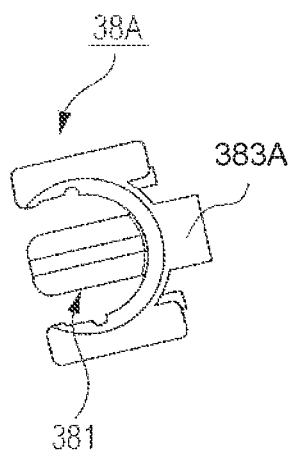
Figure 11:
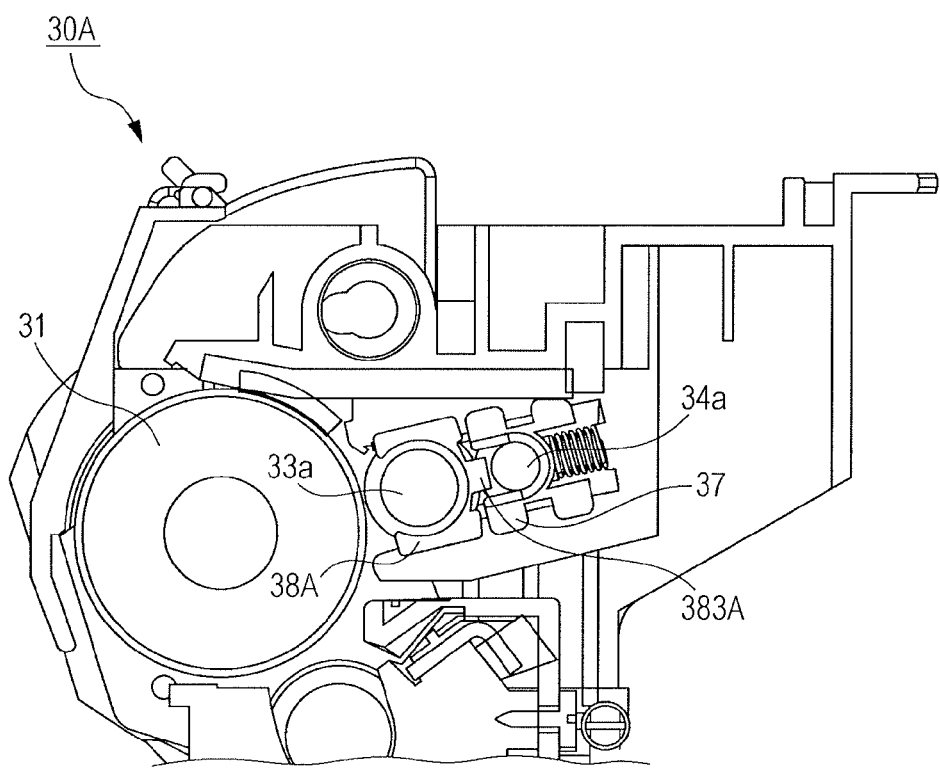
FIG. 11 is a cross-sectional view illustrating a photoconductor unit with the second bearing member mounted therein.
Figure 12:
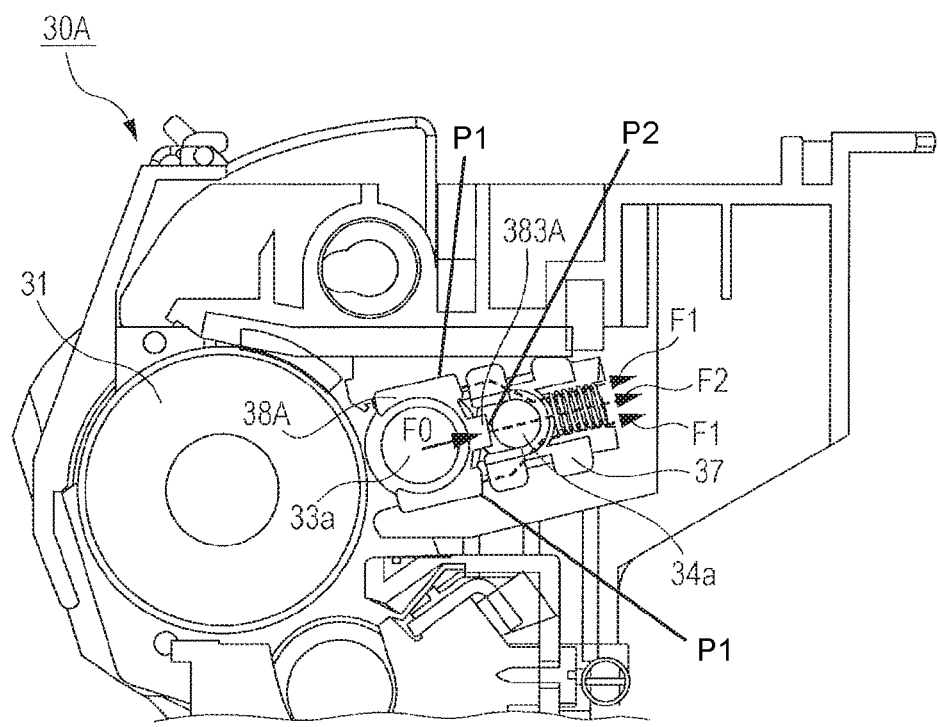
FIG. 12 is a cross-sectional view illustrating the effect of the impact load by the charging roller in the photoconductor unit.
Figure 13:
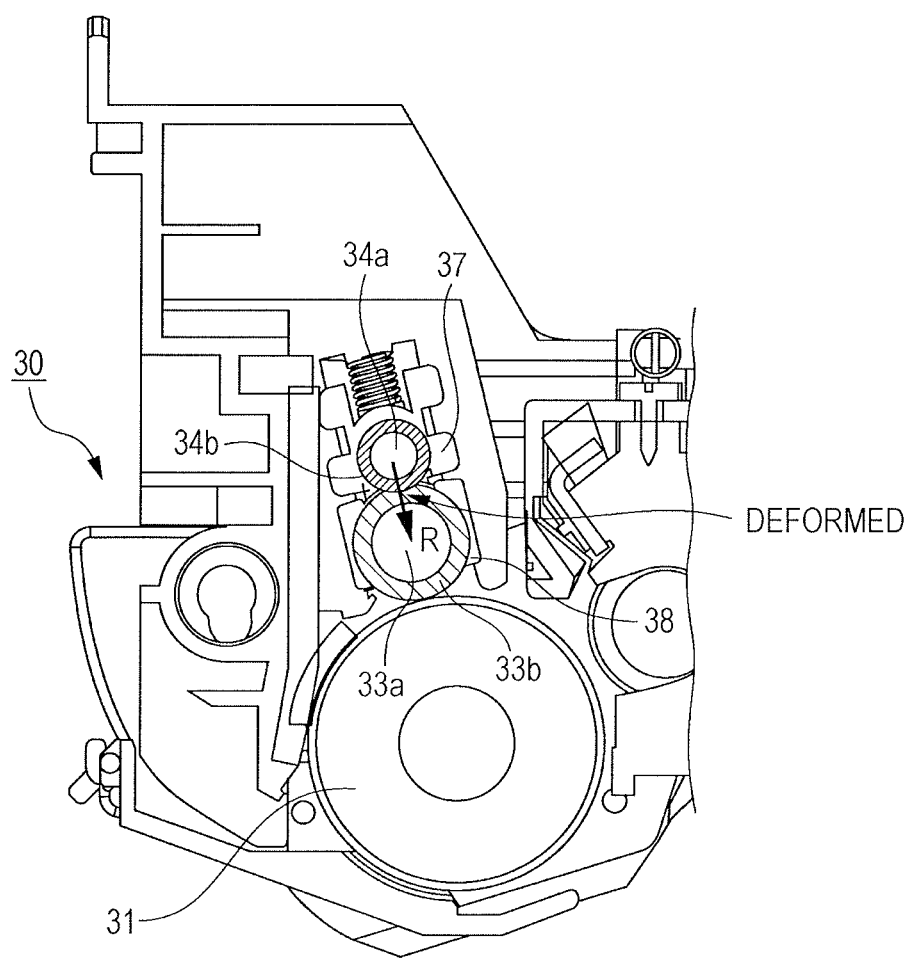
FIG. 13 is a cross-sectional view illustrating deformation of the cleaning roller in the case where the photoconductor unit is stored with the photoconductor-drum-side down for a long period of time.

FIGS. 10A and 10B are perspective views and a front view, respectively, illustrating a second bearing member 38A. FIG. 11 is a cross-sectional view illustrating a photoconductor unit 30A with the second bearing member 38A mounted therein. FIG. 12 is a cross-sectional view illustrating the effect of the impact load by the charging roller 33 in the photoconductor unit 30A. FIG. 13 is a cross-sectional view illustrating deformation of the cleaning roller 34 in the case where the photoconductor unit 30 is stored with the photoconductor drum 31 side down for a long period of time. Note that, elements common to the image forming apparatus 1 of the first exemplary embodiment are denoted by the same reference numerals, and the detailed description thereof will be omitted.

As illustrated in FIGS. 10A, 10B, and 11, according to a rotor support structure for the charging roller 33 and the cleaning roller 34 of this exemplary embodiment, the second bearing member 38A includes a recess defining a bearing section 381 that rotatably supports the peripheral surface of the shaft 33a of the charging roller 33 serving as a charging member. A protrusion 383A is formed on an outer surface of the bottom of the recess facing the shaft 34a of the cleaning roller 34.

The photoconductor unit 30A is mounted and used in the image forming apparatus 1. However, the photoconductor unit 30A is often provided as a periodic replacement service part. In the case where the photoconductor unit 30A is provided as a periodic replacement service part, the photoconductor unit 30A is packaged in a packaging member such as a package box and is transported as a package. However, the photoconductor unit 30A might be subjected to impact due to being dropped or the like in the course of transportation.

As illustrated in FIG. 12, in the case where the packaged photoconductor unit 30A is dropped, an impact force (F0) due to the weight of the charging roller 33 in a direction of the arrow is generated. Thus, the impact force is received at an abutting part between the first bearing member 37 and the second bearing member 38A, so that the bottom of the recess of the second bearing member 38A is elastically deformed toward the open portion 372 of the first bearing member 37.

Then, the protrusion 383A formed on the outer surface of the bottom of the recess of the second bearing member 38A comes into contact with the shaft 34a of the cleaning roller 34, so that the impact force (F0) is shared by an abutting part (P1) between the first bearing member 37 and the second bearing member 38A and a contact part (P2) between the protrusion 383A and the shaft 34a of the cleaning roller 34 (F1 and F2).

As a result, the impact force (F0) in the direction of the arrow due to the weight of the charging roller 33 is distributed, thereby preventing the second bearing member 38A from being deformed.

As illustrated in FIG. 13, in the case where the packaged photoconductor unit 30 is stored with the photoconductor drum 31 side down for a long period of time, the cleaning roller 34 moves in a direction of an arrow R in FIG. 13 due to the weight of the cleaning roller 34, so that the nip with the charging roller 33 becomes excessive. Thus, the sponge layer 34b might be deformed. If the sponge layer 34b is deformed permanently, the cleaning roller 34 vibrates during an image forming operation, so that the nip state of the charging roller 33 with respect to the photoconductor drum 31 fluctuates. Thus, image defects due to non-uniform charging might occur.

In the case where the packaged photoconductor unit 30A is stored with the photoconductor drum 31 side down for a long period of time, the shaft 34a of the cleaning roller 34 comes into contact with the protrusion 383A formed on the outer surface of the bottom of the recess of the second bearing member 38A, so that the movement of the cleaning roller 34 in the direction of the arrow R is restricted.

As a result, the sponge layer 34b is prevented from being deformed, and the cleaning roller 34 is prevented from vibrating during an image forming operation.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A rotor bearing member that is attached to a support body, wherein the support body includes a guide section that supports a first member and a second member such that the first member and the second member are movable toward a rotor, the first member including a rotary shaft and rotating about the rotary shaft thereof while being in contact with the rotor, the second member including a rotary shaft which extends along the rotary shaft of the first member and cleaning a surface of the first member while rotating in contact with the first member, the rotor bearing member comprising:
   a first bearing member that rotatably supports the rotary shaft of the second member; and
   a second bearing member that rotatably supports the rotary shaft of the first member;
   wherein the first bearing member and the second bearing member support the rotary shaft of the second member and the rotary shaft of the first member, respectively, while the first bearing member and the second bearing member about each other,
   wherein the first bearing member has an open portion to which the second member is attached, and an inclined surface is formed at each of corners of the open portion.

2. The rotor bearing member according to claim 1, wherein a protrusion is formed on either one of a surface of the first bearing member and a surface of the second bearing member that abut each other.

3. The rotor bearing member according to claim 1, wherein the first bearing member has a groove formed in a direction of movement toward the rotor and sliding on the support body, and a projection is formed on a bottom of the groove.

4. The rotor bearing member according to claim 3, wherein side walls extend upright from the bottom of the groove, and an inclined surface is formed at each of corners of the side walls on a side to be inserted into the guide section of the support body.

5. The rotor bearing member according to claim 1, wherein the second bearing member includes a recess that receives a peripheral surface of the rotary shaft of the first member, the recess being open at one end thereof and having a bottom at another end thereof, and a protrusion is formed on an outer surface of the bottom facing the rotary shaft of the second member.

6. The rotor bearing member according to claim 1, wherein the guide section has an open portion to which the first bearing member and the second bearing member are attached, and a protrusion protruding toward the first bearing member and the second bearing member is formed at each of corners of the open portion.

7. A photoconductor unit comprising:
   an image carrier as a rotor;
   a charging member as a first member;
   a cleaning member as a second member; and
   the rotor bearing member of claim 1.

8. An image forming apparatus comprising:
   the photoconductor unit of claim 7;
   a latent image forming unit that forms a latent image by exposing the image carrier which is charged by the charging member;
   a developing device that develops the latent image formed by the latent image forming unit;
   a transfer unit that transfers an image obtained through development by the developing device onto a recording medium; and
   a fixing unit that fixes the image transferred onto the recording medium by the transfer unit.

* * * * *